United States Patent
De Luca et al.

(10) Patent No.: US 8,827,340 B2
(45) Date of Patent: Sep. 9, 2014

(54) VEHICLE FLOOR ASSEMBLY AND METHOD FOR ASSEMBLY

(71) Applicant: GM Global Technology Operations LLC, Detroit, MI (US)

(72) Inventors: Fabian De Luca, Luedenscheid (DE); Juergen Hulbert, Eltville (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/672,920

(22) Filed: Nov. 9, 2012

(65) Prior Publication Data
US 2013/0119710 A1 May 16, 2013

(30) Foreign Application Priority Data
Nov. 11, 2011 (DE) .......................... 10 2011 118 328

(51) Int. Cl.
*B62D 25/20* (2006.01)
*B62D 29/00* (2006.01)
*B62D 65/02* (2006.01)
*B62D 27/02* (2006.01)
*B62D 65/18* (2006.01)
*F16B 11/00* (2006.01)

(52) U.S. Cl.
CPC .............. *B62D 25/20* (2013.01); *B62D 29/005* (2013.01); *B62D 65/02* (2013.01); *F16B 11/006* (2013.01); *B62D 27/026* (2013.01); *B62D 65/18* (2013.01); *Y10S 296/90101* (2013.01)
USPC .................. 296/35.1; 296/181.2; 296/193.07; 296/204; 296/901.01; 296/187.02

(58) Field of Classification Search
USPC ......... 296/35.1, 193.07, 203.01–203.04, 204, 296/209, 901.01, 187.02
See application file for complete search history.

(56) References Cited

U.S. PATENT DOCUMENTS

| | | | |
|---|---|---|---|
| 4,898,419 A * | 2/1990 | Kenmochi et al. ............. 296/204 |
| 5,129,700 A * | 7/1992 | Trevisan et al. .......... 296/193.07 |
| 5,806,796 A * | 9/1998 | Healey ....................... 244/117 R |
| 6,439,649 B1 * | 8/2002 | Lorenzo et al. ............ 296/181.3 |
| 6,905,745 B2 | 6/2005 | Sheldon et al. |
| 2006/0150389 A1 | 7/2006 | Schwarz |
| 2010/0133878 A1* | 6/2010 | Teli et al. ................. 296/193.07 |
| 2012/0235445 A1 | 9/2012 | De Luca |

FOREIGN PATENT DOCUMENTS

| | | |
|---|---|---|
| DE | 3011386 A1 | 10/1981 |
| DE | 3011428 A1 | 10/1981 |
| DE | 3801337 A1 | 8/1989 |
| DE | 102004062933 A1 | 8/2006 |
| DE | 102007035415 A1 | 2/2009 |

OTHER PUBLICATIONS

German Patent Office, German Search Report for Application No. 102011118 328.4 dated Sep. 6, 2012.

* cited by examiner

*Primary Examiner* — Dennis H Pedder
(74) *Attorney, Agent, or Firm* — Ingrassia Fisher & Lorenz, P.C.

(57) ABSTRACT

A method for fastening an in particular tub-shaped floor panel to an in particular frame-like vehicle structure is provided. The method includes applying an adhesive to a contact surface of the floor panel and/or of the vehicle structure, and joining the floor panel and the vehicle structure. The method includes expanding and/or activating the adhesive by heating the joint vehicle structure-floor panel composite.

13 Claims, 2 Drawing Sheets

VEHICLE FLOOR ASSEMBLY AND METHOD FOR ASSEMBLY

CROSS-REFERENCE TO RELATED APPLICATION

This application claims priority to German Patent Application No. 10 2011 118 328.4, filed Nov. 11, 2011, which is incorporated herein by reference in its entirety.

TECHNICAL FIELD

This application pertains to a method for fastening a floor panel to a vehicle structure of a vehicle floor assembly and a vehicle floor assembly having a floor panel. The application also pertains to a vehicle structure which have been fastened to one another by means of such a method.

BACKGROUND

According to DE 38 01 337 A1 it is known to fasten a plastic floor panel to a metal frame of a vehicle floor assembly in that the metal frame is cast into the plastic floor panel or glued to the latter.

If a separate gluing station is established in the assembly line of the vehicle floor assembly for this purpose, this disadvantageously requires a significant restructuring of the assembly line. Up to now, this has been standing in the way of a use of plastic floor panels.

Accordingly, it may be desirable to provide an improved vehicle floor assembly and method for assembly. In addition, other objects, desirable features and characteristics will become apparent from the subsequent summary and detailed description, and the appended claims, taken in conjunction with the accompanying drawings and this background.

SUMMARY

According to one of various aspects of the present disclosure, a vehicle floor assembly comprises at least one floor panel. In one exemplary embodiment, this floor panel is produced from plastic, in one example, at least one thermoplastic and/or thermosetting plastic and for example, comprises polyamide, polyester resins, polyethylene, polypropylene, polyvinyl chloride, polystyrene, polyurethane and/or polyethylene terephthalate. In addition or alternatively, the floor panel can be configured tub-shaped. In terms of the present disclosure, this to mean in one example, that the floor panel has an at least substantially U-shaped cross section with a recessed floor area and a rim that is elevated relative to said floor area, wherein the rim in another exemplary embodiment comprises a flange, which is in one example, at least substantially parallel to the floor area.

The vehicle floor assembly furthermore comprises a vehicle structure. In another exemplary embodiment, said vehicle structure is produced from metal, in one example, light metal and for example, an aluminum alloy. Additionally or alternatively, the vehicle structure can be configured frame-like. To this end, it can comprise two or more, in one example, at least substantially parallel side members and/or one, two or more in one example, at least substantially parallel cross members in another exemplary embodiment. A structure having only two, in one example, at least substantially parallel side members or cross members is also designated frame-like in terms of the present disclosure, which thus also includes frames that are open on one or both sides. In another exemplary embodiment, the frame-like vehicle structure comprises two side members and two cross members between which the floor panel is arranged.

According to another of various aspects of the present disclosure, an adhesive is initially applied to a contact surface of the floor panel. Additionally or alternatively, the same or another adhesive can be applied to a contact surface of the vehicle structure. In a generalizing manner, an adhesive in terms of the present disclosure is to also mean a component of a multi-component adhesive (compound). A contact surface can be suitably treated, in one example, roughed-up, smoothed and/or cleaned beforehand. Additionally or alternatively, a contact surface can be designed strip-like, in one example, frame-like.

In another exemplary embodiment, the adhesive is applied in advance and the floor panel and/or the vehicle structure with the applied, substantially solid and/or dried adhesive delivered to the assembly line. Thus, an existing assembly line can be continuously used advantageously without inserting a gluing station. Accordingly, no gluing station for applying adhesive to the floor panel and/or vehicle structure is present in an assembly line.

Following this, the floor panel and the vehicle structure are joined. In another exemplary embodiment, they can be positively and/or non-positively connected in this case. In addition, the floor panel can comprise a fixing means for the positive and/or non-positive connecting to the vehicle structure, which in another exemplary embodiment is elastically deformable. Thus, the fixing means can have one or a plurality of protrusions which positively engage in recesses of the vehicle structure. If such protrusions remain elastically deformed also in engagement, this constitutes a frictional and thus non-positive connection at the same time. In another exemplary embodiment, a flange of the floor panel is clamped in between the adhesive contact surface and the elastically deformable fixing means. Additionally or alternatively, the vehicle structure can comprise in the same manner fixing means for the positive and/or non-positive connecting to the floor panel. In this manner, the vehicle structure-floor panel composite can be advantageously fixed during the following step.

Following this, the joined vehicle structure-floor panel composite is heated. In another exemplary embodiment, this takes place in an oven through which the composite passes. In another exemplary embodiment, the heating takes place in a painting facility, in one example, a drying oven. In this manner, two process steps can be carried out jointly and no additional station has to be provided in the assembly line.

According to another of various aspects of the present disclosure, the adhesive expands through the heating. In one example, this is to mean that the adhesive substantially permanently enlarges its volume. In this manner, the adhesive can fill out intermediate spaces, in one example, joints between vehicle structure and floor panel and, thus seal the floor panel against the vehicle structure. Additionally or alternatively, the expanding adhesive can brace vehicle structure and floor panel, in one example, a fixing means, thus bringing about or reinforcing a fastening. In another exemplary embodiment, the adhesive is a foam adhesive. In one example, this is to mean that the adhesive initially during heating and/or in a final state comprises bubbles or a foam structure. Such foam adhesives can advantageously dampen vibrations between floor panel and vehicle structure.

In another exemplary embodiment, the adhesive is applied in a depression, which is provided in the contact surface of the floor panel and/or the vehicle structure. Because of this, the adhesive can be arranged more precisely and in one example, a running prevented or rendered more difficult. In another exemplary embodiment, the adhesive expands upon heating beyond the depression and in the process comes into contact with the other contact surface of floor panel or vehicle structure.

Additionally or alternatively to the expanding, the heating can activate the adhesive. Here, this is to mean in one example, that the adhesive develops or increases its adhesive action through the heating. In another exemplary embodiment, the adhesive comprises one or a plurality of polymers, in one example, thermoplastics. The adhesive can also be of the self-adhesive type. In one example, this is to mean that the adhesive already has an, if required minor, adhesive effect even without additional, for example, thermal and/or chemical activation. Because of this, a fixing of floor panel and vehicle structure on one another can likewise be achieved.

In another exemplary embodiment, the adhesive or the glued joint bonds after the heating. If the heating takes place in an oven, in one example a drying oven of a painting facility, a section of the assembly line following thereupon can be advantageously used for hardening the adhesive in addition to the stations provided there. In one example, but not necessarily, a stiffening of the adhesive or of the glued joint takes place with the hardening.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
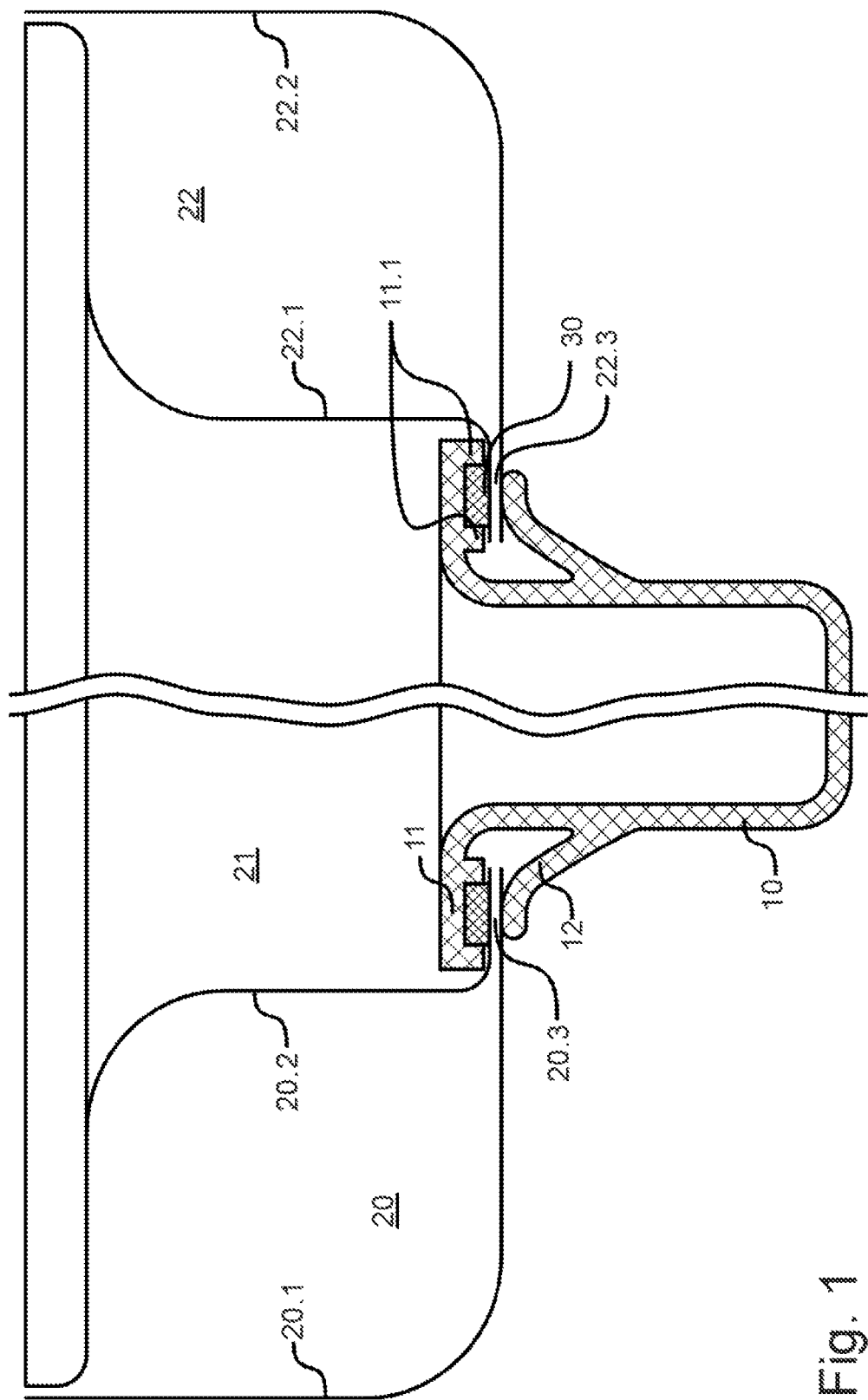
FIG. 1 is a vehicle structure-floor panel composite according to an exemplary embodiment of the present disclosure in cross section.

In a cross section, FIG. 1 shows a frame-like vehicle structure having two parallel side members 20, 22 and two cross members that are perpendicular thereto, of which in the section of FIG. 1 only one cross member 21 is visible. The four members are substantially identical and each embodied as two-piece sheet metal construction, wherein in the section of FIG. 1 the two halves 20.1, 20.2 and 22.1, 22.2 of the side members 20, 22 are visible. In a modification which is not shown, one or a plurality of members are designed unitarily, in one example, as extruded profile. It is evident that the members each have a lower flange 20.3 and 22.3 respectively facing the member located opposite.

On the vehicle structure 20-22, a tub-like floor panel 10 with a U-shaped cross section that is visible in FIG. 1 is fastened. The floor panel 10 has a lower floor area and walls that are substantially perpendicular thereto, which continue on the side located opposite the floor area into a circumferential flange 11 facing away from the floor area that is parallel to the latter. The floor panel 10 is cast or formed from plastic.

Figure 2B:
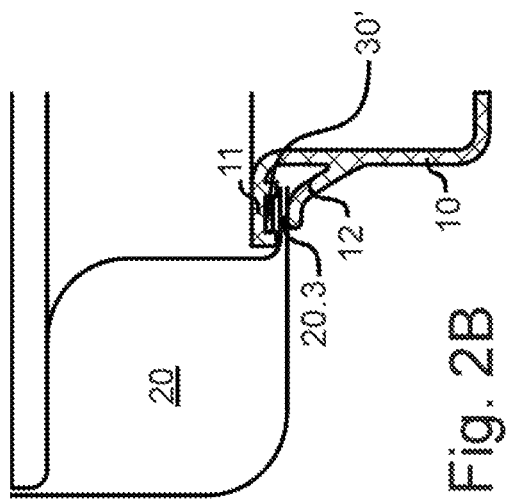
FIG. 2A and FIG. 2B illustrate steps during the fastening of the floor panel and of the vehicle structure of FIG. 1 to one another according to an exemplary embodiment of the present disclosure in representation corresponding to FIG. 1.
Figure 2A:
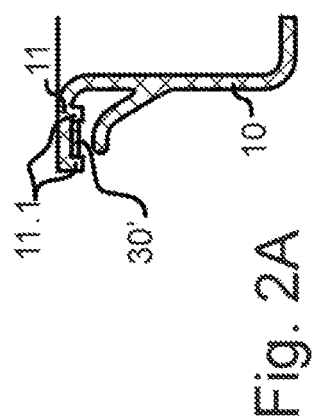

On the flange 11, a depression is defined by two webs 11.1 relative to the web margins. In these, as is shown in FIG. 2A, an adhesive 30' is initially applied so that it does not protrude over the web margins. This can take place away from the assembly line.

Following this, the floor panel 10 with applied adhesive 30' is delivered to the assembly line. There, as shown in FIG. 2B, floor panel 10 and vehicle structure 20-22 are positively and non-positively joined.

To this end, an elastically deformable fixing means in the form of an at least partially circumferential clip or a plurality of individual clips 12 is provided on the floor panel 10. The floor panel 10 is pushed into the frame-like vehicle structure 20-22 from above. In the process, the clip or clips 12 are elastically deformed and following the passing through the opening of the frame-like vehicle structure 20-22, press against the flanges 20.3, 22.3 of said vehicle structure from below. In this manner, the flanges 20.3, 22.3 are braced between a contact surface and the fixing means 12.

The joined vehicle structure-floor panel composite is now guided onwards on the assembly line. In a drying oven of a painting facility (not shown), the vehicle structure-floor panel composite is heated as shown in FIG. 1. In the process, the adhesive 30 expands so that it moves beyond the margins of the webs 11.1, contacts the flanges 20.3, 22.3 where it adheres, while additionally increasing the bracing of said flanges with the clips 12. Through the heating, the adhesive 30 is activated at the same time so that it develops of increases its adhesive action.

Having passed through the drying oven, the adhesive cools down and hardens in the process. In this manner, a glued bond of the floor panel 10 to the vehicle structure 20-22 can be realized in an existing assembly line without additional gluing stations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A method for fastening a floor panel to a vehicle structure comprising:
   applying an adhesive to a contact surface of at least one of a tub-shaped floor panel and a frame-like vehicle structure;
   joining the floor panel and the frame-like vehicle structure;
   at least one of expanding and activating the adhesive through heating the joined vehicle structure and floor panel, wherein
   the floor panel further comprises an elastically deformable fixing means configured to connect the floor pane to the frame-like vehicle structure after passing completely through the frame-like vehicle structure.

2. The method according to claim 1, further comprising:
delivering the floor panel with the adhesive applied to an assembly line in which it is joined to the frame-like vehicle structure; and
heating the joined vehicle structure and floor panel.

3. The method according to claim 2, further comprising:
heating the joined vehicle structure and floor panel to at least one of expand and activate the adhesive in a drying oven of a painting facility.

4. The method according to claim 3, wherein the floor panel and the frame-like vehicle structure are one of positively and frictionally connected prior to the heating.

5. The method according to claim 1, wherein the adhesive is applied in a depression.

6. The method according to claim 1, wherein the floor panel is produced from plastic and the frame-like vehicle structure from metal.

7. The method according to claim 1, wherein the adhesive is of a self-adhesive type, and further comprises a foam adhesive.

8. The method according to claim 3, wherein the adhesive hardens after the heating.

9. The method according to claim 1, wherein the adhesive seals the floor panel against the frame-like vehicle structure.

10. A vehicle floor assembly, comprising:
a vehicle structure; and
a floor panel that is fastened to the vehicle structure by an adhesive applied to a contact surface of at least one of the floor panel and the vehicle structure,
wherein the adhesive is heated to activate the adhesive and fasten the vehicle structure and floor panel; and
an elastically deformable fixing means formed on the floor panel connecting the floor panel and the vehicle structure after passing completely through the vehicle structure.

11. The vehicle floor assembly according to claim 10, wherein the elastically deformable fixing means is configured to positively connect the other floor panel and the vehicle structure.

12. The vehicle floor assembly according to claim 11, wherein the other of the floor panel and the vehicle structure further comprises a flange that is braced between the adhesive contact surface and the elastically deformable fixing means.

13. The vehicle floor assembly according to claim 10, wherein at least one of the floor panel and the vehicle structure further comprises a depression in which the adhesive is arranged.

* * * * *